May 14, 1968  R. FAGEL  3,383,117
ROTARY JOINT
Filed Sept. 14, 1964
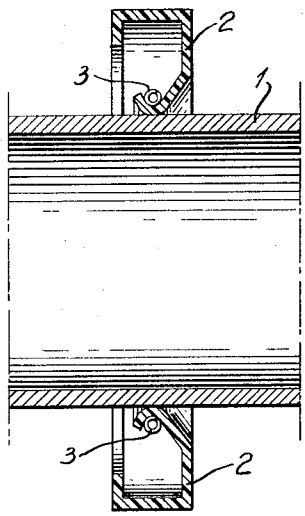
INVENTOR
Roger FAGEL
BY
ATTORNEY 3,383,117
ROTARY JOINT
Roger Fagel, Marcinelle, Belgium, assignor to Ateliers de Constructions Electriques, de Charleroi (ACEC) Societe Anonyme, Brussels, Belgium
Filed Sept. 14, 1964, Ser. No. 396,103
Claims priority, application Belgium, Sept. 19, 1963, 637,617
2 Claims. (Cl. 277—153)

The present invention relates to a rotary insulating joint for shafts.

It is known to provide rotary shafts with insulating joints consisting of a joint of rubber which may be reinforced by a circular spring and a steel collar. This type of rotary joint has already been exploited but their range of usefulness is limited by the peripheral velocity which the collar can withstand. The collar can operate only up to peripheral velocities of 12 to 16 m./sec.

It is an object of the present invention to obviate the above mentioned disadvantage so that the peripheral velocity may considerably exceed the velocity of 12 to 16 m./sec.

According to the present invention, there is provided a rotary insulating joint consisting of a metal collar and a joint made from a material having springy or elastic properties which is held against the collar by a spring, wherein the collar is made of a metal which has a good heat conductivity and wherein it is covered by a thin layer of a metal having a high tensile strength and a high hardness value, which will resist abrasion.

The present invention will now be described in greater detail by way of example with reference to the accompanying drawing wherein the sole figure is a cross sectional view of a preferred form of rotary joint, made according to the invention.

Referring to the drawing, a collar 1, made of copper is covered with a thin layer of hard chromium applied by a galvanizing process. On this collar 1 is applied a joint 2 which is made of ordinary rubber or other material having springy or elastic properties. The joint 2 is held against the collar 1 by means of a circular spring 3. In this type of rotary insulating joint, the heat produced under the lip of the joint is rapidly dissipated due to the good thermal conductivity of the copper, which is protected against abrasion by the layer of chromium which has a high hardness value. Since chromium has a high tensile strength it is able to withstand peripheral velocities considerably in excess of 25 m./sec.

As illustrated, joint 2 is generally rectangular in cross-section with the inner wall thereof inclined toward collar 1 and terminating in an outwardly turned edge defining a housing for the reception of circular spring 3.

I claim:
1. A rotary insulating joint comprising: a metal collar; a joint mounted over said collar made of a material having springy or elastic properties; a spring mounted on said joint to hold it against said collar; the collar being made of copper having a good heat conductivity and being covered by a thin layer of a metal having a high tensile strength and a high hardness value capable of resisting abrasion.

2. A rotary insulating joint as claimed in claim 1, wherein said covering metal is chromium.

References Cited

UNITED STATES PATENTS 3,207,521   9/1965   Dega _____ 277—153

FOREIGN PATENTS 1,194,378   5/1959   France.

LAVERNE D. GEIGER, Primary Examiner.
D. MASSENBERG, Assistant Examiner.